(12) United States Patent
Nishimoto

(10) Patent No.: US 12,516,920 B2
(45) Date of Patent: Jan. 6, 2026

(54) BENDING SENSOR

(71) Applicant: Murata Manufacturing Co., Ltd., Nagaokakyo (JP)

(72) Inventor: Keisuke Nishimoto, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 160 days.

(21) Appl. No.: 18/491,717

(22) Filed: Oct. 20, 2023

(65) Prior Publication Data

US 2024/0053134 A1    Feb. 15, 2024

Related U.S. Application Data

(63) Continuation of application No. PCT/JP2022/025581, filed on Jun. 27, 2022.

(30) Foreign Application Priority Data

Jun. 30, 2021 (JP) .................................. 2021-108331

(51) Int. Cl.
G01B 7/30 (2006.01)

(52) U.S. Cl.
CPC ....................... *G01B 7/30* (2013.01)

(58) Field of Classification Search
CPC ........................................................ G01B 7/30
See application file for complete search history.

(56) References Cited

U.S. PATENT DOCUMENTS

| 8,250,927 | B2* | 8/2012 | Anand | G01B 7/18 |
| | | | | 73/777 |
| 2012/0055257 | A1 | 3/2012 | Shaw-Klein | |
| 2014/0361980 | A1 | 12/2014 | Iwaki et al. | |
| 2020/0033205 | A1 | 1/2020 | Mori | |
| 2021/0064173 | A1* | 3/2021 | Nishida | G01B 11/00 |
| 2022/0196489 | A1 | 6/2022 | Kinjo | |

FOREIGN PATENT DOCUMENTS

| CN | 113838373 A | 12/2021 |
| JP | H06174407 A | 6/1994 |
| JP | 2015015018 A | 1/2015 |
| JP | 2020047281 A | 3/2020 |
| JP | 2021043171 A | 3/2021 |
| WO | 2019021856 A1 | 1/2019 |

OTHER PUBLICATIONS

International Search Report in PCT/JP2022/025581, mailed Jul. 26, 2022, 3 pages.

* cited by examiner

*Primary Examiner* — Reena Aurora
(74) *Attorney, Agent, or Firm* — ArentFox Schiff LLP

(57) ABSTRACT

A bending sensor that includes: a piezoelectric film having a principal surface and an end surface; a bendable substrate; and an adhesive on the principal surface of the piezoelectric film and that bonds the piezoelectric film to the bendable substrate, wherein the adhesive covers the end surface in at least a bending portion of the piezoelectric film that is configured to bend together with the bendable substrate.

16 Claims, 7 Drawing Sheets

BENDING SENSOR

CROSS REFERENCE TO RELATED APPLICATIONS

The present application is a continuation of International application No. PCT/JP2022/025581, filed Jun. 27, 2022, which claims priority to Japanese Patent Application No. 2021-108331, filed Jun. 30, 2021, the entire contents of each of which are incorporated herein by reference.

TECHNICAL FIELD

An embodiment of the present invention relates to a bending sensor.

BACKGROUND ART

FIG. 2B of Patent Document 1 discloses a piezoelectric panel in which pressure sensitive adhesives are disposed on both principal surfaces of a piezoelectric film. The piezoelectric panel of Patent Document 1 is used for, for example, a touch sensor.

Patent Document 1: Japanese Patent Application Laid-Open No. 2020-47281

SUMMARY OF THE INVENTION

When the piezoelectric film is mounted on a bendable electronic device, stress is concentrated on a bending portion, and there is a possibility that the piezoelectric film is cracked.

Therefore, an object of the embodiment of the present invention is to provide a bending sensor that prevents concentration of stress and prevents occurrence of cracks in a bendable device.

A bending sensor according to an embodiment of the present invention includes: a piezoelectric film having a principal surface and an end surface; a bendable substrate; and an adhesive on the principal surface of the piezoelectric film and that bonds the piezoelectric film to the bendable substrate, wherein the adhesive covers the end surface in at least a bending portion of the piezoelectric film that is configured to bend together with the bendable substrate.

According to the embodiment of the present invention, the concentration of stress can be prevented and occurrence of cracks can be prevented in the bendable device.

DETAILED DESCRIPTION OF THE INVENTION

In the following, description is made of a bending sensor 1 and an electronic device 100 including the bending sensor 1 according to an embodiment of the present invention with reference to the drawings. Note that, in each drawing, electrodes, wiring, and the like are omitted for ease of description.

Figure 1A:
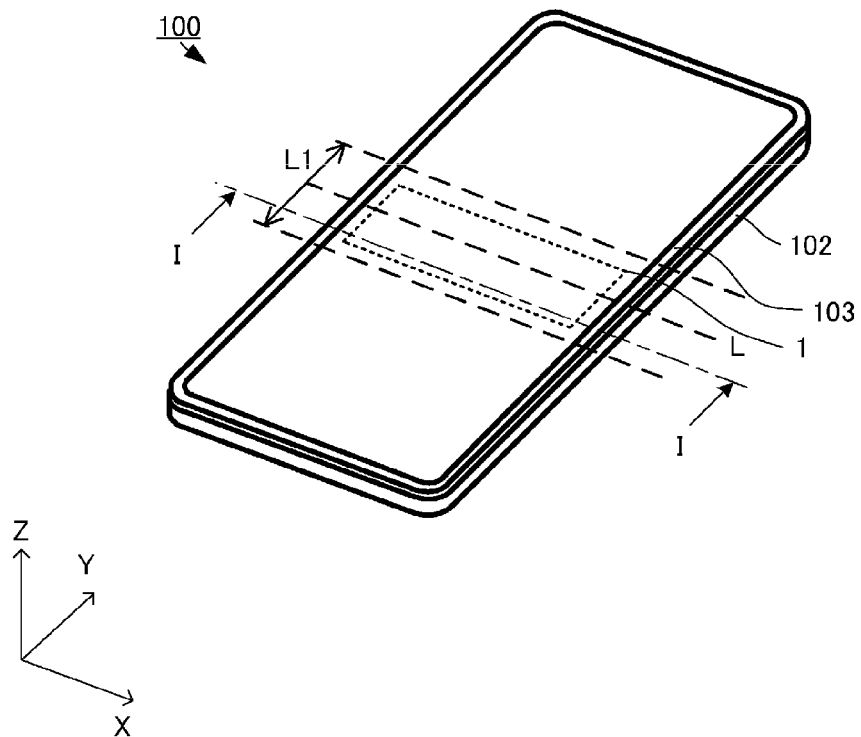
FIG. 1(A) is a perspective view of an electronic device 100 including a bending sensor 1.
Figure 1B:
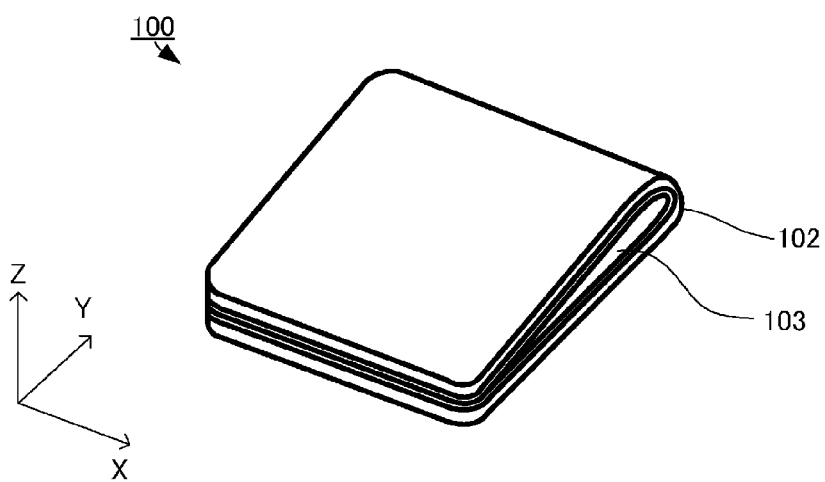
FIG. 1(B) is a perspective view of the electronic device 100 in a bent state.

FIG. 1(A) is a perspective view of the electronic device 100 including the bending sensor 1. FIG. 1(B) is a perspective view of the electronic device 100 in a bent state. The electronic device 100 is an information processing device such as a smartphone.

Figure 2:
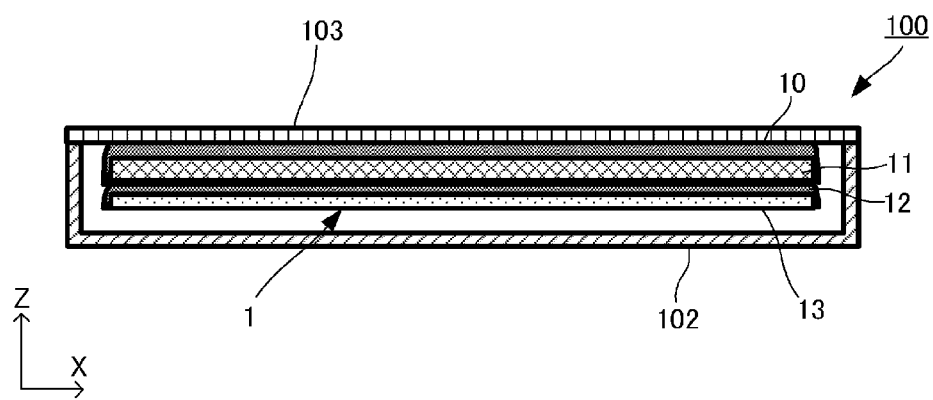
FIG. 2 is a schematic sectional view of the electronic device 100.

FIG. 2 is a schematic sectional view of the electronic device 100 illustrated in FIG. 1(A) taken along a line I-I illustrated in FIG. 1(A). Note that in FIG. 2, the bending sensor 1 is illustrated in a large size for convenience of explanation, and other electronic components and the like are omitted.

As illustrated in FIG. 1(A), the electronic device 100 includes a casing 102 having a substantially rectangular parallelepiped shape. The electronic device 100 includes a flat plate shaped surface panel 103 disposed in the casing 102. The surface panel 103 functions as an operation surface on which a user performs a touch operation using a finger, a pen, or the like. Hereinafter, a description is given assuming that a width direction (horizontal direction) of the casing 102 is an X direction, a length direction (vertical direction) is a Y direction, and a thickness direction is a Z direction.

As illustrated in FIG. 2, the electronic device 100 includes a bending sensor 1 inside the casing 102. The bending sensor 1 is attached to the surface of the surface panel 103 on the inner side of the casing 102. The bending sensor 1 includes an adhesive 10, a piezoelectric film 11, an adhesive 12, and a protective film 13.

The bending sensor 1 is attached to the surface panel 103 of the electronic device 100 with the adhesive 10. Note that, in this example, the bending sensor 1 is attached to the surface panel 103, but there is a case where the bending sensor 1 is attached to a display, a touch sensor, or the like. Note that, in a case where the bending sensor 1 is transparent, the bending sensor 1 may be disposed on the side of the surface panel 103 rather than on the display.

The casing 102, the surface panel 103, and the bending sensor 1 have flexibility. This allows the electronic device 100 to be bent. In this example, the electronic device 100 can be bend in a predetermined range centered on a bending line L parallel to the X direction as a bending portion L1. Note that, although in this example, the surface panel 103 is bent inward, the surface panel 103 may be bent outward.

The electronic device 100 can be opened and closed from 0° to 180°. The bending sensor 1 detects whether the electronic device 100 is bent or not and a bent state (current opening/closing angle) of the electronic device 100. Note that the electronic device 100 may be made bendable by providing a hinge, a bellows structure, or the like at a bent portion.

The piezoelectric film 11 of the bending sensor 1 is formed in a rectangular shape in plan view. The adhesive 10, the adhesive 12, and the protective film 13 have a flat film shape, and are formed in a rectangular shape in plan view similarly to the piezoelectric film 11.

The piezoelectric film 11 includes, for example, a chiral polymer such as polyvinylidene fluoride (PVDF) or polylactic acid. As the polylactic acid (PLA), either poly-L-lactic acid (PLLA) or poly-D-lactic acid (PDLA) may be used. The piezoelectric film 11 is polarized by being expanded and contracted in the planar direction when the electronic device 100 is bent, and generates a potential difference between a first principal surface and a second principal surface thereof.

Not-illustrated electrodes are formed on both the first and second principal surfaces of the piezoelectric film 11. These electrodes are connected to a not-illustrated voltage detection circuit. The voltage detection circuit detects a potential difference between the electrodes on both the principal surfaces. A not-illustrated arithmetic unit connected to the voltage detection circuit detects the bending of the surface panel 103 (e.g., a substrate) when a potential difference (voltage) becomes a predetermined value or more. The arithmetic unit can also detect the bent state (opening/closing angle) of the surface panel 103 by performing operation such as integration on the voltage generated by the piezoelectric film.

Figure 3:
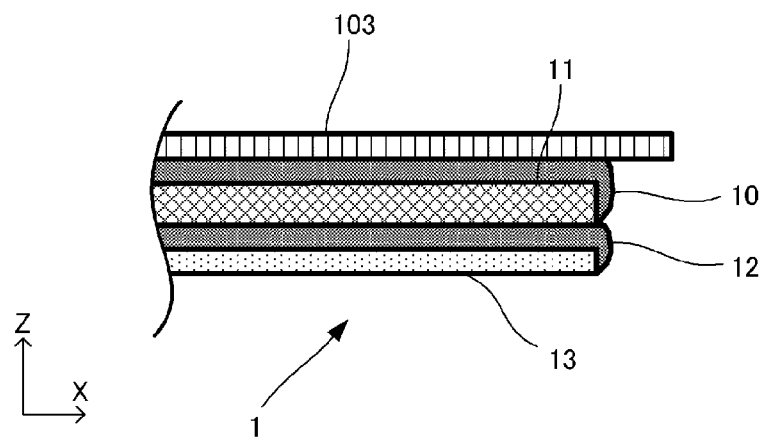
FIG. 3 is a sectional view of a bending sensor 1 with a portion thereof enlarged.

FIG. 3 is a sectional view of the bending sensor 1 with a portion thereof enlarged. The casing 102 is omitted in FIG. 3. The piezoelectric film 11 includes a first principal surface and a second principal surface. In this example, along the Z direction, the adhesive 12 as a first adhesive is attached to the first principal surface, and the adhesive 10 as the second adhesive is attached to the second principal surface. The protective film 13 is attached to the first principal surface with the adhesive 12 interposed therebetween. The surface panel 103 is attached to the second principal surface with the adhesive 10 interposed therebetween. Note that the protective film 13 is not an indispensable component according to the present embodiment. In this case, the adhesive 12 is also not required.

Figure 4:
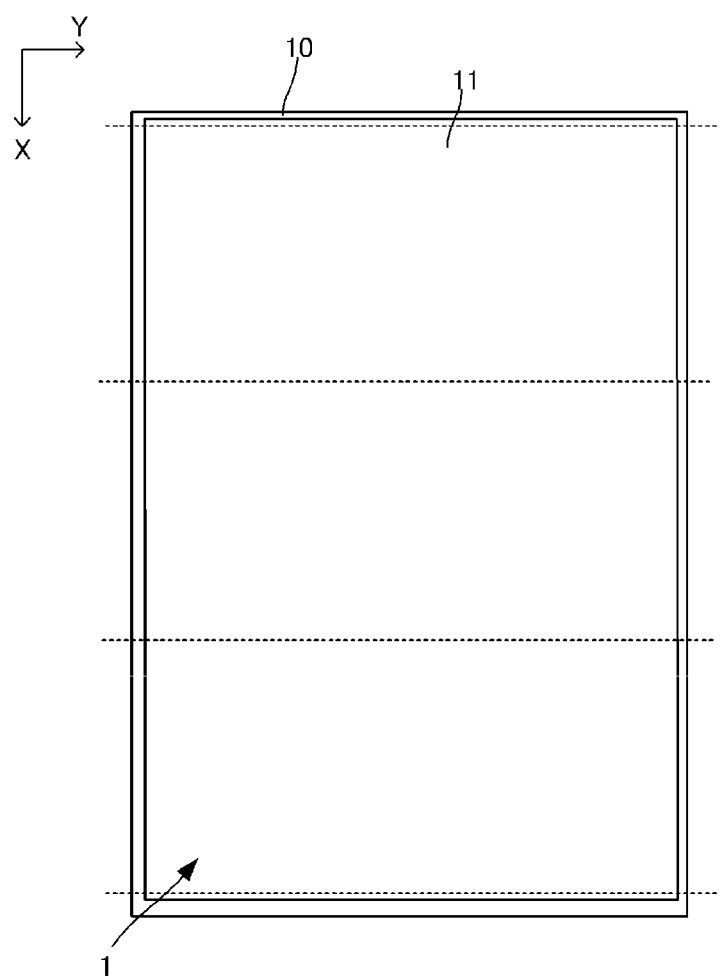
FIG. 4 is a plan view illustrating a mother sheet before a piezoelectric film 11 is cut out.

In the piezoelectric film 11, an end surface thereof (end surface in the X direction) within the bending portion L1 which is bent together with the surface panel 103 (e.g., a substrate) is covered with the adhesive 10. FIG. 4 is a plan view illustrating a mother sheet before the piezoelectric film 11 is cut out. The piezoelectric film 11 is cut from the mother sheet illustrated in FIG. 4 with a pinnacle blade or the like to be divided into individual pieces. In the example in FIG. 4, the piezoelectric film 11 is cut by the pinnacle blade from the second principal surface side of the piezoelectric film 11. Then, the section of the adhesive 10 disposed on the second principal surface extends along the end surface of the piezoelectric film 11 in the X direction by the pinnacle blade and covers the end surface of the piezoelectric film 11.

As a result, at least the end surface of the piezoelectric film 11 within the bending portion L1 in the X direction is covered with the adhesive 10. The adhesive 10 positioned in this manner relieves strain and stress. Therefore, the adhesive 10 prevents concentration of stress on the end surface of the piezoelectric film 11 within the bending portion L1 in the X direction.

Figure 5A:
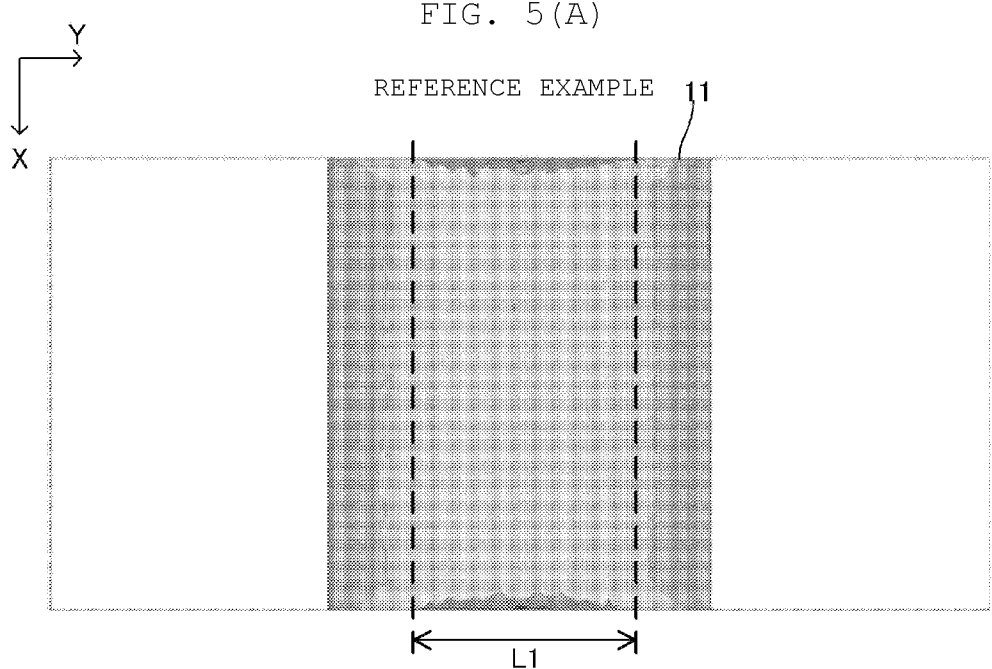
FIG. 5(A) is a diagram illustrating a strain distribution according to a reference example.
Figure 5B:
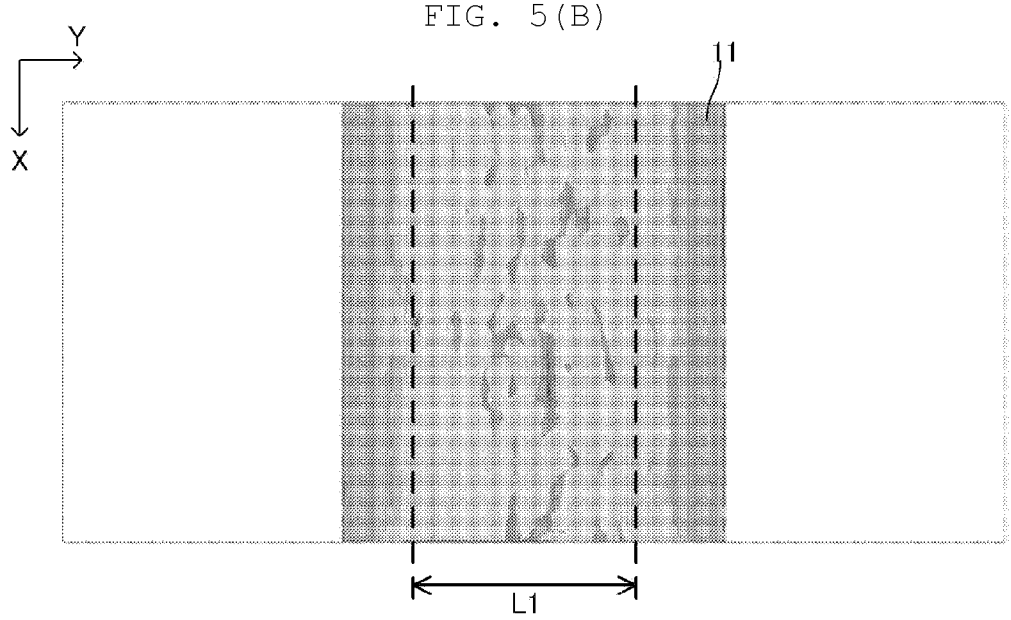
FIG. 5(B) is a diagram illustrating a strain distribution according to the present embodiment.

FIG. 5(A) is a diagram illustrating a strain distribution according to a reference example, and FIG. 5(B) is a diagram illustrating a strain distribution according to the present embodiment. The strain distribution of the reference example is a simulation in a case where the end surface of the piezoelectric film is not covered with the adhesive.

As illustrated in FIG. 5(A), in the piezoelectric film of the reference example, strain is concentrated in the vicinity of the end surface of the piezoelectric film within the bending portion L1 in the X direction. On the other hand, in the piezoelectric film 11 of the present embodiment, strain is dispersed, and no large strain is generated in the vicinity of the end surface of the piezoelectric film within the bending portion L1 in the X direction.

As described above, the bending sensor 1 according to the present embodiment can prevent concentration of stress on the piezoelectric film 11 and prevent occurrence of cracks in the piezoelectric film 11 in the bendable device.

In FIG. 3, an example has been illustrated in which the end surface of the piezoelectric film 11 is covered with the adhesive 10 on the second principal surface side. However, for example, as described below, the end surface of the piezoelectric film 11 may be covered with the adhesive 12 on the first principal surface side.

Figure 6:
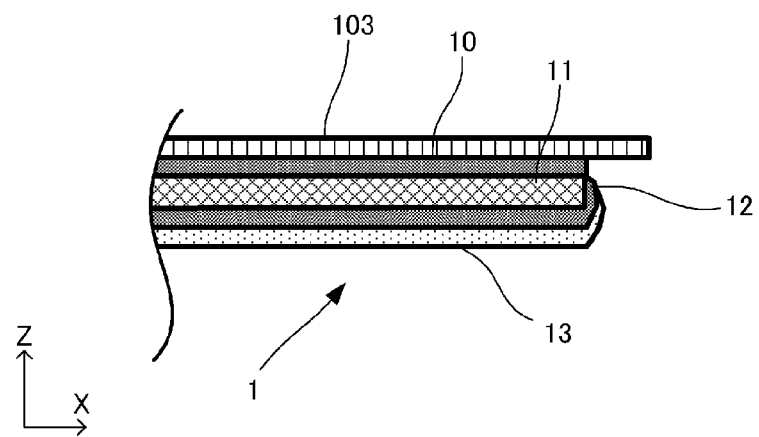
FIG. 6 is a sectional view of the bending sensor 1 with a portion thereof enlarged.

FIG. 6 is a sectional view of the bending sensor 1 with a portion thereof enlarged. However, for example, as described in FIG. 6, the end surface of the piezoelectric film 11 may be covered with the adhesive 12 on the first principal surface side. In this case, the piezoelectric film 11 is cut by the pinnacle blade from the first principal surface side. Then, the section of the adhesive 12 disposed on the first principal surface extends along the end surface of the piezoelectric film 11 in the X direction by the pinnacle blade and covers the end surface of the piezoelectric film 11.

In addition, as illustrated in FIG. 6, in a case where the protective film 13 is also cut from the mother sheet at the same time, there is a case where the end surface of the piezoelectric film 11 is further covered with the protective film 13. In this case, the end surface of the piezoelectric film 11 is also protected by the protective film 13.

Figure 7:
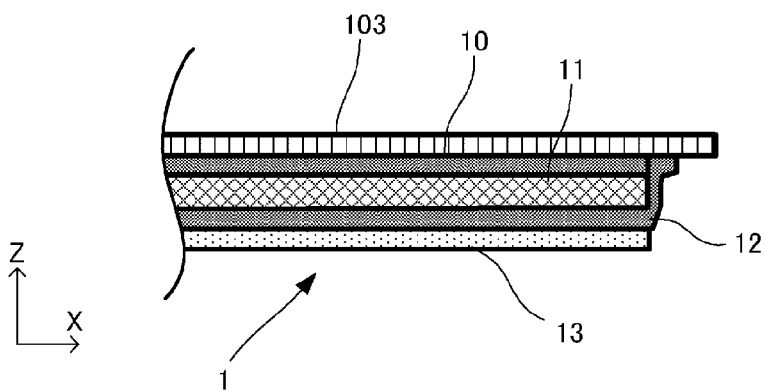
FIG. 7 is a sectional view of the bending sensor 1 according to a modification with a portion thereof enlarged.

FIG. 7 is a sectional view of the bending sensor 1 according to a modification with a portion thereof enlarged. In the example in FIG. 7, the adhesive 10 and the adhesive 12 are in contact with each other. In this case, the end surface of the piezoelectric film 11 in the X direction is fully covered with the adhesive 12. In the example in FIG. 7, because the piezoelectric film 11 is cut from the first principal surface side, the adhesive 12 extends along the end surface of the piezoelectric film 11 and comes into contact with the adhesive 10. However, when the piezoelectric film 11 is cut from the second principal surface side, the adhesive 10 extends along the end surface of the piezoelectric film 11 and comes into contact with the adhesive 12. As a result, the bending sensor 1 can further prevent concentration of stress.

Figure 8:
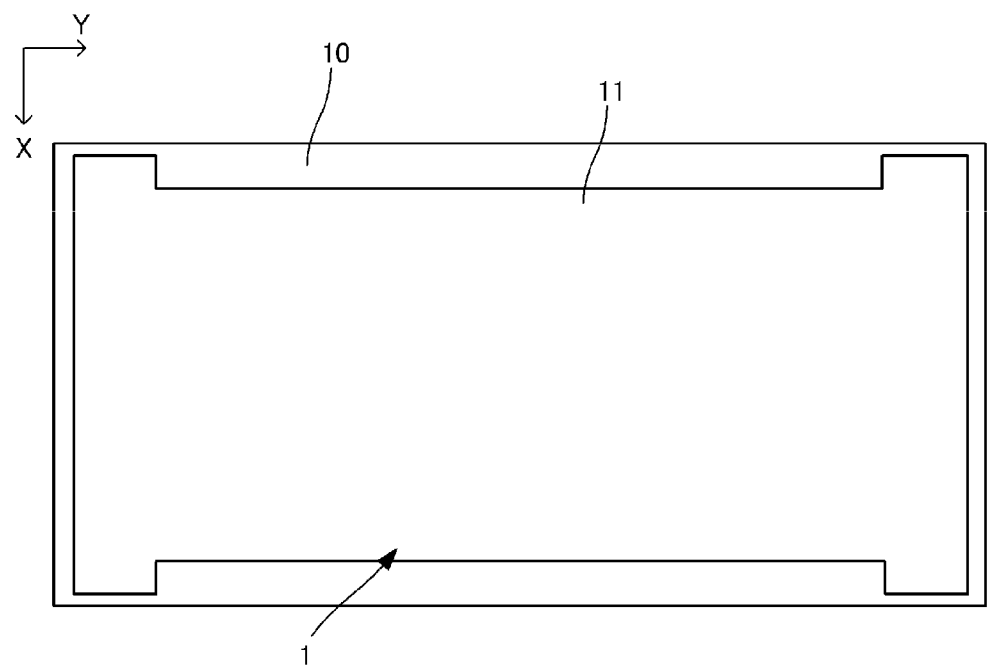
FIG. 8 is a plan view of the bending sensor 1.
Figure 9:
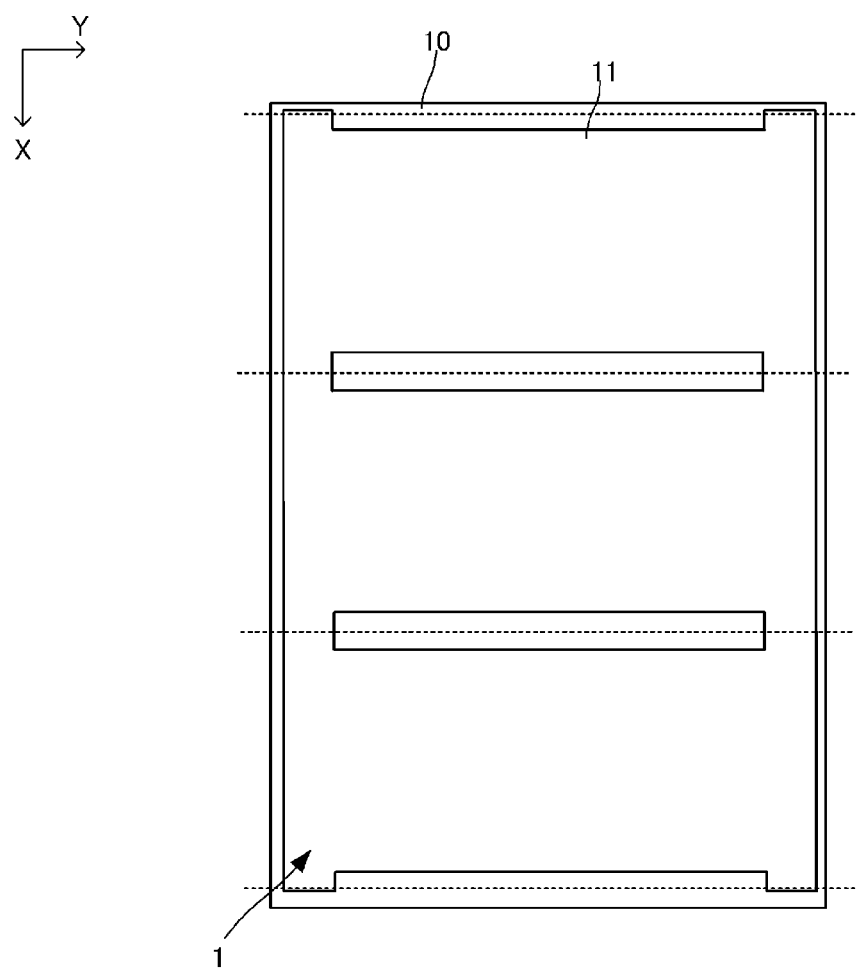
FIG. 9 is a plan view illustrating a mother sheet before the piezoelectric film 11 is cut out.

FIG. 8 is a plan view of the bending sensor 1. FIG. 9 is a plan view illustrating a mother sheet before the piezoelectric film 11 is cut out. In the piezoelectric film 11 illustrated in FIG. 9, the length along the X direction at the central portion in the Y direction is shorter than the length in the X direction at the end portion in the Y direction.

In order to bring the first adhesive and the second adhesive into contact with each other as shown in FIG. 7, for example, as shown in plan views in FIGS. 8 and 9, the area of the piezoelectric film 11 only needs to be made smaller than the area of the adhesive (the adhesive 10 or the adhesive 12) in plan view. In this way, when the piezoelectric film 11 is cut out from the mother sheet, the first adhesive and the second adhesive come into contact with each other.

In the example of the piezoelectric film 11 in FIGS. 8 and 9, the length of the piezoelectric film 11 along the X direction is shorter than the length of the adhesive 10 (or the adhesive 12) along the X direction at most portions other than the end portion in the Y direction. However, the length of the piezoelectric film 11 along the X direction only needs to be shorter than that of the adhesive 10 (or the adhesive 12) at least at the bending portion L1. That is, only the length of the piezoelectric film 11 in the first direction (X direction) along the bending line in the bending portion L1 in plan view needs to be shorter than the length of the adhesive (the adhesive 10 or the adhesive 12) in the first direction.

In this way, when the piezoelectric film 11 is cut out from the mother sheet, the first adhesive and the second adhesive come into contact with each other at least in the bending portion L1. As a result, the bending sensor 1 can further prevent concentration of stress.

Note that the length of the piezoelectric film in the X direction in the bending portion L1 is preferably shorter by 4% or more than the length of the adhesive in the X direction. The inventor has confirmed that the concentration of stress can be prevented and the occurrence of cracks can be prevented by making the length of the piezoelectric film in the X direction in the bending portion L1 shorter than the length of the adhesive in the X direction by 4% or more.

Finally, the description of the embodiment should be considered in all respects as illustrative and not restrictive. The scope of the present invention is defined not by the above-described embodiments but by the claims. Furthermore, the scope of the present invention includes a scope equivalent to the claims.

For example, in the present embodiment, an example in which both the end surfaces of the piezoelectric film 11 in the X direction are covered with the adhesive has been described. However, as long as at least one end surface of the piezoelectric film 11 in the X direction is covered with the adhesive, the concentration of stress can be prevented.

DESCRIPTION OF REFERENCE SYMBOLS

1: Bending sensor
10: Adhesive
11: Piezoelectric film
12: Adhesive
13: Protective film
100: Electronic device
102: Casing
103: Surface panel

The invention claimed is:

1. A bending sensor comprising:
   a piezoelectric film having a principal surface and an end surface connected to the principal surface, the piezoelectric film being bendable in a bending portion thereof;
   a bendable substrate; and
   an adhesive on the principal surface of the piezoelectric film and that bonds the piezoelectric film to the bendable substrate, wherein the adhesive covers the end surface of the piezoelectric film in at least the bending portion of the piezoelectric film, and the bending portion is configured to bend together with the bendable substrate.

2. The bending sensor according to claim 1, wherein
   the principal surface of the piezoelectric film is a second principal surface,
   the adhesive is a second adhesive on the second principal surface,
   the piezoelectric film has a first principal surface opposite the second principal surface,
   the bending sensor includes a first adhesive on the first principal surface, and
   the bending portion of the piezoelectric film is covered with the first adhesive or the second adhesive.

3. The bending sensor according to claim 2, wherein the first adhesive and the second adhesive are in contact with each other.

4. The bending sensor according to claim 2, further comprising a protective film on the first adhesive.

5. The bending sensor according to claim 1, wherein the piezoelectric film has an area in a plan view thereof, the area being smaller than an area of the adhesive in the plan view.

6. The bending sensor according to claim 5, wherein the piezoelectric film has a first length in a first direction along a bending line in the bending portion in the plan view, the first length being shorter than a second length of the adhesive in the first direction.

7. The bending sensor according to claim 6, wherein the first length of the piezoelectric film in the first direction is shorter than the second length of the adhesive in the first direction by 4% or more.

8. The bending sensor according to claim 1, wherein the end surface is a first end surface, the piezoelectric film includes a second end surface opposite the first end surface, and the adhesive covers the first end surface and the second end surface in at least the bending portion of the piezoelectric film.

9. A bending sensor comprising:
   a piezoelectric film having a first principal surface, a second principal surface opposite the first principal surface, and an end surface connecting the first principal surface and the second principal surface, the piezoelectric film being bendable in a bending portion thereof;
   a bendable substrate attached to the second principal surface of the piezoelectric film; and
   an adhesive on the first principal surface of the piezoelectric film, wherein the adhesive covers the end surface in at least the bending portion of the piezoelectric film, and the bending portion is configured to bend together with the bendable substrate.

10. The bending sensor according to claim 9, further comprising:
    a second adhesive on the second principal surface and that bonds the piezoelectric film to the bendable substrate.

11. The bending sensor according to claim 10, wherein the first adhesive and the second adhesive are in contact with each other.

12. The bending sensor according to claim 10, further comprising a protective film on the first adhesive.

13. The bending sensor according to claim 9, wherein the piezoelectric film has an area in a plan view thereof, the area being smaller than an area of the adhesive in the plan view.

14. The bending sensor according to claim 13, wherein the piezoelectric film has a first length in a first direction along a bending line in the bending portion in the plan view, the first length being shorter than a second length of the adhesive in the first direction.

15. The bending sensor according to claim 14, wherein the first length of the piezoelectric film in the first direction is shorter than the second length of the adhesive in the first direction by 4% or more.

16. The bending sensor according to claim 9, wherein the end surface is a first end surface, the piezoelectric film includes a second end surface opposite the first end surface, and the adhesive covers the first end surface and the second end surface in at least the bending portion of the piezoelectric film.

* * * * *